US012319547B2

(12) United States Patent
Wiedemann

(10) Patent No.: US 12,319,547 B2
(45) Date of Patent: Jun. 3, 2025

(54) CRANE HAVING A COUNTER-BOOM AND METHOD FOR ERECTING THE COUNTER-BOOM

(71) Applicant: LIEBHERR-WERK EHINGEN GMBH, Ehingen/Donau (DE)

(72) Inventor: Ulrich Wiedemann, Ulm (DE)

(73) Assignee: LIEBHERR-WERK EHINGEN GMBH, Ehingen/Donau (DE)

( * ) Notice: Subject to any disclaimer, the term of this patent is extended or adjusted under 35 U.S.C. 154(b) by 187 days.

(21) Appl. No.: 17/904,780

(22) PCT Filed: Feb. 9, 2021

(86) PCT No.: PCT/EP2021/053080
§ 371 (c)(1),
(2) Date: Aug. 22, 2022

(87) PCT Pub. No.: WO2021/170394
PCT Pub. Date: Sep. 2, 2021

(65) Prior Publication Data
US 2023/0051341 A1 Feb. 16, 2023

(30) Foreign Application Priority Data
Feb. 28, 2020 (DE) ..................... 10 2020 105 336.3

(51) Int. Cl.
*B66C 23/82* (2006.01)
*B66C 23/36* (2006.01)

(52) U.S. Cl.
CPC ............ *B66C 23/82* (2013.01); *B66C 23/365* (2013.01)

(58) Field of Classification Search
CPC .............................. B66C 23/82; B66C 23/365
See application file for complete search history.

(56) References Cited

U.S. PATENT DOCUMENTS 2,813,636 A 11/1957 Preston
4,349,115 A 9/1982 Lampson
(Continued)

FOREIGN PATENT DOCUMENTS

DE 102011014585 A1 9/2012
DE 202015008775 U1 3/2017
(Continued)

OTHER PUBLICATIONS

ISA European Patent Office, International Search Report Issued in Application No. PCT/EP2021/053080, May 18, 2021, WIPO, 5 pages.

*Primary Examiner* — Emmanuel M Marcelo
*Assistant Examiner* — Juan J Campos, Jr.
(74) *Attorney, Agent, or Firm* — McCoy Russell LLP

(57) ABSTRACT

This invention relates to a crane, in particular a mobile crane or crawler crane, comprising a main boom and a counter boom as well as an erecting trestle arranged on the upper-carriage of the crane, which is connected to a guying of the counter-boom via a cable adjuster, wherein there is provided at least one pressure prop articulated to the counter-boom or on the pivot axis of the counter-boom in order to temporarily receive the cable adjuster and/or the guying, wherein the receiving point of the pressure prop is designed such that the cable adjuster or guying can lift off from the pressure prop on its own at a particular erecting angle of the counter-boom.

17 Claims, 6 Drawing Sheets

(56) References Cited

U.S. PATENT DOCUMENTS

| | | | | |
|---|---|---|---|---|
| 5,199,586 | A * | 4/1993 | Pech | B66C 23/70 212/175 |
| 7,762,412 | B2 | 7/2010 | Porubcansky | |
| 11,046,560 | B2 * | 6/2021 | Koyahata | F16B 5/0004 |
| 2018/0029853 | A1 | 2/2018 | Hamaguchi | |
| 2019/0359456 | A1 * | 11/2019 | Koyahata | F16B 5/0004 |

FOREIGN PATENT DOCUMENTS

| | | | |
|---|---|---|---|
| JP | 55791782 | U | 6/1982 |
| WO | 02062696 | A1 | 8/2002 |

* cited by examiner

CRANE HAVING A COUNTER-BOOM AND METHOD FOR ERECTING THE COUNTER-BOOM

CROSS REFERENCE TO RELATED APPLICATIONS

The present application is a U.S. National Phase of International Application No. PCT/EP2021/053080 entitled "CRANE COMPRISING COUNTERJIB, AND METHOD FOR ERECTING THE COUNTERJIB," and filed on Feb. 9, 2021. International Application No. PCT/EP2021/053080 claims priority to German Patent Application No. 10 2020 105 336.3 filed on Feb. 28, 2020. The entire contents of the above-listed applications are hereby incorporated by reference for all purposes.

TECHNICAL FIELD

This invention relates to a crane, in particular a mobile crane or crawler crane, comprising a main boom and a counter-boom as well as an erecting trestle arranged on the uppercarriage of the crane, which is connected to a guying of the counter-boom via a cable adjuster.

BACKGROUND AND SUMMARY

A lattice mast large crane generally consists of a main boom and a counter-boom. The boom system is mounted on an uppercarriage that is rotatably mounted on a mobile undercarriage. For erecting the crane, the main boom is assembled by means of the counter-boom assembled and erected already, in that the counter-boom serves as a prop for the cable adjuster for erecting the main boom.

In the previously known crane types, an adjustable erecting trestle mounted on the uppercarriage is required for the assembly of the counter-boom. This is illustrated in the schematic crane representations of FIGS. 1*a*, 1*b*, which show a crane having an undercarriage 11 and an uppercarriage 12. The adjustable erecting trestle 4' is connected to the boom head of the counter-boom 3 via a guying 6. The cable adjuster 5 is directly attached to the uppercarriage 12 and connected to the guying 6. By retracting the cable adjuster 5, the counter-boom 3 can be erected. The reason for the chosen construction is the possibility to operate the crane without a counter-boom 3. A prerequisite for this is the adjustable erecting trestle 4'. The chosen construction is used in particular in cranes with lifting capacities up to 1500 t.

In large cranes with lifting capacities above 1500 t, the use of the counter-boom is obligatory. For erecting the counter-boom, various types of the required erecting trestle 4 have been developed for such cranes. The most widely used type is a stationary erecting trestle 4 arranged on the uppercarriage 11, which serves as a fixed point and pressure prop for the cable adjuster 5 during the erection of the counter-boom 3. This principle is illustrated in FIGS. 2*a*, 2*b*. A solution with an adjustable erecting trestle 4' as shown in FIGS. 1*a*, 1*b* is not possible here due to the required high weight of such an erecting trestle 4' and space problems on the uppercarriage.

The present application seeks possible improvements to the existing solutions.

In accordance with the invention it is proposed to supplement a crane body comprising a cable adjuster and an erecting trestle arranged on the uppercarriage by an additional pressure prop that is articulated to the counter-boom, in particular in the vicinity of the counter-boom foot or the pivot axis of the counter-boom. The pressure prop preferably is pivotally articulated, in particular pivotable about a horizontal axis. What also is imaginable is an articulation of the pressure prop directly on the pivot axis of the counter-boom. In this case, the pivot axis of the pressure prop can be coaxial to the pivot axis of the counter-boom. The cable adjuster usually is connected to the guying in order to be able to change the erecting angle of the counter-boom by actuating the cable adjuster. The guying usually extends from the cable adjuster to the tip of the counter-boom.

At least during the erecting process, the pressure prop contacts the cable adjuster and/or the guying, and the pressure prop in particular receives the cable adjuster and/or guying at its free end via a suitable bearing point. The cable adjuster and/or guying thereby can be urged away from the back of the counter-boom by means of the pressure prop.

Due to the compressive force additionally applied by the pressure prop onto the cable adjuster/guying, the used erecting trestle at the rear of the uppercarriage or the turntable can be dimensioned distinctly smaller. The geometry for the lever arm and the generation of the required erecting moment is significantly produced by the employed pressure prop. According to the solution of the prior art, by contrast, the erecting trestle must protrude from the uppercarriage comparatively far in a vertical direction in order to at all be able to generate a sufficient erecting moment for the counter-boom.

Another advantage of the invention consists in that in the inventive geometry formed of erecting trestle, cable adjuster, pressure prop and guying, changes in the angle of the counter-boom lead to minor changes of the lever arm, which altogether has a positive influence on the entire process in particular in flat positions.

The possible size saving with the erecting trestle also leads to consequential advantages. The changed geometry during power transmission leads to the fact that the retraction length of the cable adjuster required for erecting the counter-boom is reduced.

According to a preferred embodiment, the pressure prop is articulated to the back of the counter-boom. What is found to be advantageous is a pivotal attachment of the pressure prop on the back of the counter-boom in the vicinity of its boom foot. This position of the pressure prop results in an optimum influence on the resulting lever arm during the erection of the counter-boom.

It likewise is in accordance with the invention that the connection between pressure prop and cable adjuster or guying only is temporary, i.e. the cable adjuster or counter-boom guying can lift itself off the pressure prop on its own. In particular, it is provided that the cable adjuster/guying is operatively connected to the pressure prop only at the beginning of the erecting process of the counter-boom. From a specific erecting angle of the counter-boom, the cable adjuster/guying lifts itself off the pressure prop on its own. To prevent the pressure prop from tipping over after the cable adjuster has lifted off, a corresponding arresting point can be provided. Tipping over can take place in both directions.

It is advantageous when the cable adjuster or guying rests on a suitable bearing point of the pressure prop, which permits lifting off at a certain erecting angle of the counter-boom, but a tensile force generating a pivotal movement of the pressure prop can be applied onto the pressure prop by means of the cable adjuster. This can be imagined to happen by corresponding arresting means, such as the guying, or stops in the vicinity of the bearing point.

The bearing point of the pressure prop preferably is suitable for receiving and bearing the roller axis of a top block of the cable adjuster. In the ideal case, the running of the cable pulleys is not impaired thereby, so that the cable adjuster operates without limitation. It is conceivable for example that the bearing point permits the roller axis to lift off in the longitudinal direction of the pressure prop, but relative movements of the top block transversely to the longitudinal axis of the pressure prop are prevented due to corresponding side stops. It is likewise imaginable that the top block of the cable adjuster can temporarily be fixed to the pressure prop by means of a locking mechanism.

The erecting trestle used can be configured as a stationary, in particular triangular erecting trestle on the uppercarriage. Preferably, the same is mounted at the rear end of the uppercarriage. Beside the cable adjuster, the erecting trestle likewise can receive a retracting mechanism of the cable adjuster.

According to an advantageous embodiment of the crane, the same is configured as a mobile crane or crawler crane. A suitable lattice boom here is employed as a counter-boom. The main boom for example is a lattice boom.

Beside the crane according to the invention, the present invention also relates to a method for erecting the counter-boom of a crane according to the present invention. According to the invention, it is proposed for the method that at the beginning of the erecting process of the counter-boom the cable adjuster or guying is received by the bearing point of the pressure prop at a small erecting angle of the counter-boom in order to be urged away from the back of the counter-boom by means of the pressure prop. At a defined erecting angle of the counter-boom, the cable adjuster/guying is meant to lift off from the pressure prop on its own.

The far-reaching advantages that are obtained by the execution of the method have already been explained above with reference to the crane. To avoid repetitions, further embodiments therefore are omitted at this point.

For the execution of the method it initially is proposed as a first step to mount the counter-boom on the uppercarriage together with the pressure prop already articulated there. In the subsequent step it can be provided to fold the pressure prop forwards in the direction of the counter-boom tip. In a further step, the cable adjuster likewise is pulled forwards in order to deposit the same at the end on the bearing point of the pressure prop provided for this purpose. At the same time, the guying of the counter-boom is connected, in particular bolted to the cable adjuster.

In a subsequent step it can be provided that by retracting the retracting mechanism of the cable adjuster, the pressure prop initially is erected up to a certain angle. This is achieved by corresponding stops or arresting means in the vicinity of the bearing point, which provide for a tensile force transmission from the cable adjuster to the pressure prop. At the same time, the tensile force leads to tensioning of the counter-boom guying.

In a subsequent step, the counter-boom can be erected by further retraction of the retracting mechanism of the cable adjuster, namely up to a specific desired erecting angle. From a particular counter-boom angle, the cable adjuster automatically lifts off from the pressure prop. The pressure prop no longer is required during the further crane work. The counter-boom solely is guyed and luffable by the guying and the cable adjuster. The counter-boom is deposited in the reverse order. Due to the above-mentioned arresting point, the pressure prop remains in the position in which the pressure prop can again pick up the top block at a certain depositing angle.

BRIEF DESCRIPTION OF THE FIGURES

Further advantages and properties of the invention will be explained in detail below with reference to an exemplary embodiment illustrated in the Figures. In the drawing.

DETAILED DESCRIPTION

Figure 1A:
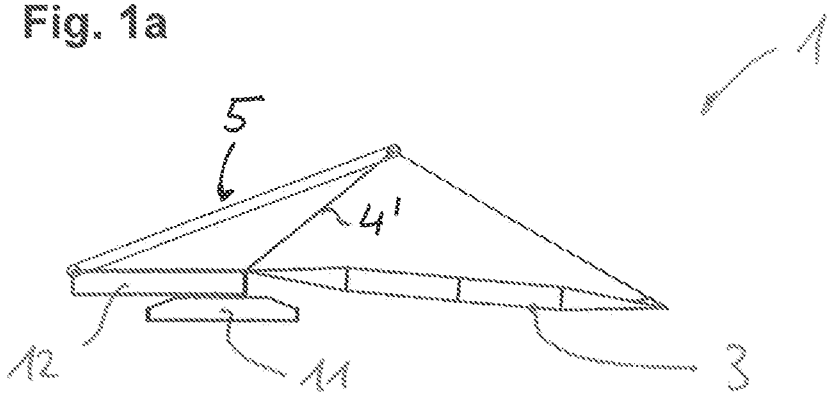
FIGS. 1*a*, 1*b*, 2*a*, 2*b*: show different embodiments of a crane according to the prior art.
Figure 1B:
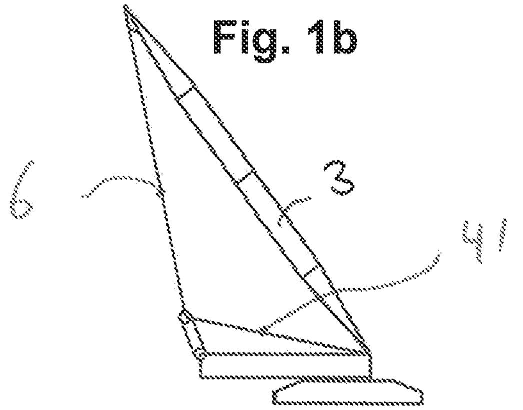
Figure 2A:
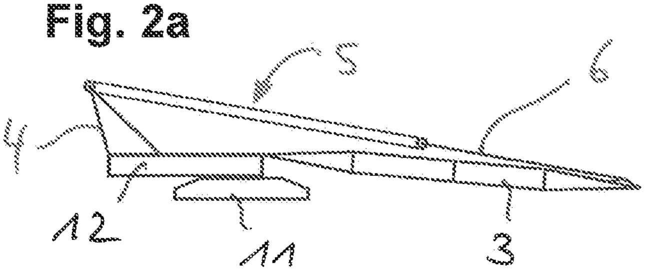
Figure 2B:
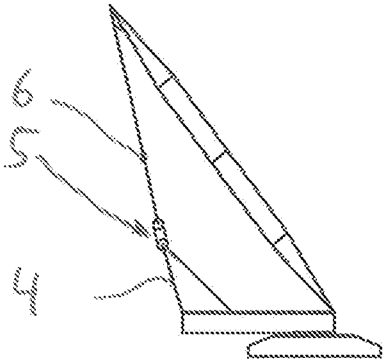

The crane constructions according to the prior art, as shown in FIGS. 1*a*, 1*b*, 2*a*, 2*b*, have been explained already in the introductory part. A repetitive description therefore is omitted.

The construction according to the invention is shown in FIGS. 3*a*-3*f* and 4. The individual crane components are best recognizable in the large representation of FIG. 4. The large crane shown there includes an undercarriage 11, here a crawler traveling gear, as well as a turntable 12 rotatably arranged on the undercarriage. A derrick-type counter-boom 3 is luffably articulated to the turntable 12. The main boom 13 likewise is luffably mounted on the turntable and is configured as a lattice mast.

At the rear end of the uppercarriage 2 an erecting trestle 40 is located, which is stationarily mounted on the uppercarriage 12 as a rigid construction. The erecting trestle 40 substantially is triangular. At the uppermost point of the erecting trestle 40 the cable adjuster 5 is mounted. The length of the cable adjuster 5 can be set by means of the retracting mechanism 5*a*, which likewise is mounted on the erecting trestle 40.

The guying 6, consisting of individual guy rods, is bolted directly to the top block 51 of the cable adjuster 5. By actuating the retracting mechanism 5*a*, i.e. by retracting the cable, the length of the cable adjuster 5 is reduced, whereby the guying can be tensioned, varied in length, and the derrick boom 3 can be luffed.

The pressure prop 311 according to the invention is mounted on the articulation foot of the derrick boom 3 so as to be pivotable about a horizontal axis. Its free end is provided with a suitable bearing point 311*a* in order to receive the top block 51 and exert a compressive force on the pressure prop 311.

Figure 3A:
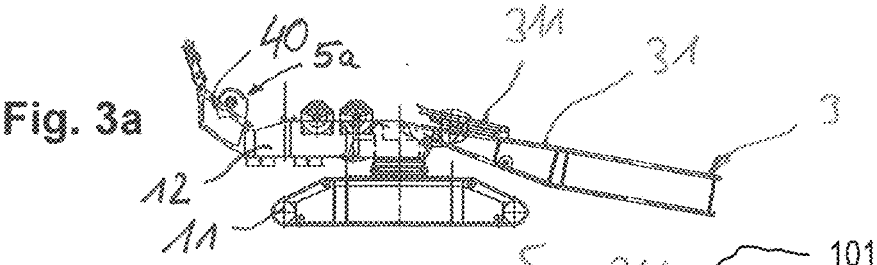
FIGS. 3*a*-3*f*: show representations of the crane according to the invention during the execution of the method of the invention in chronological order.
Figure 3B:
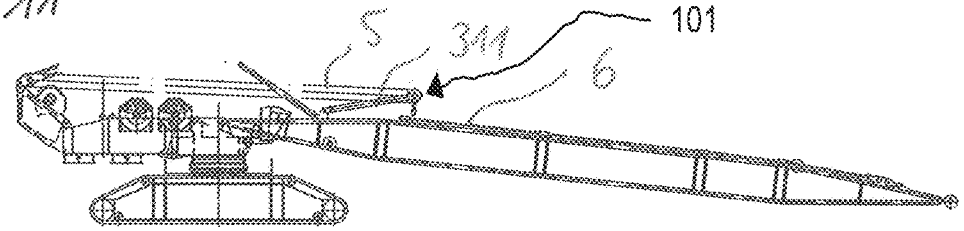
Figure 3C:
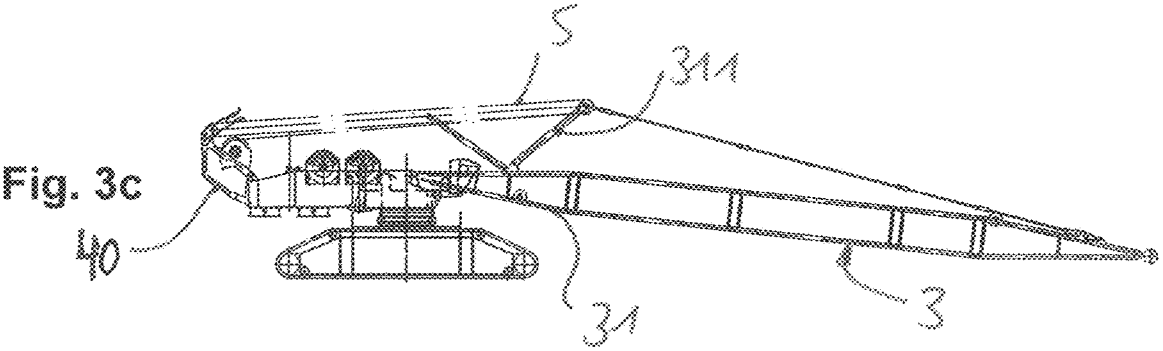
Figure 3D:
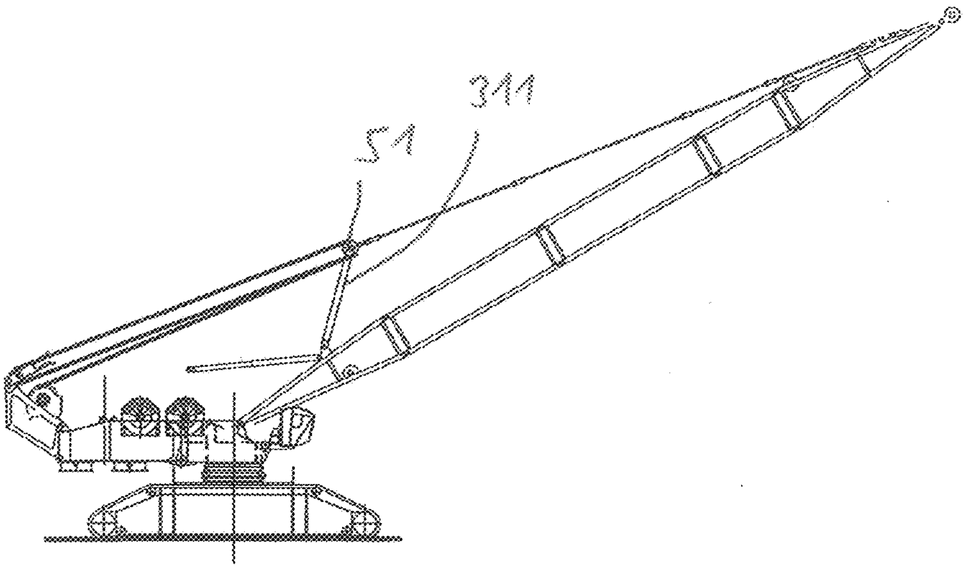
Figure 3E:
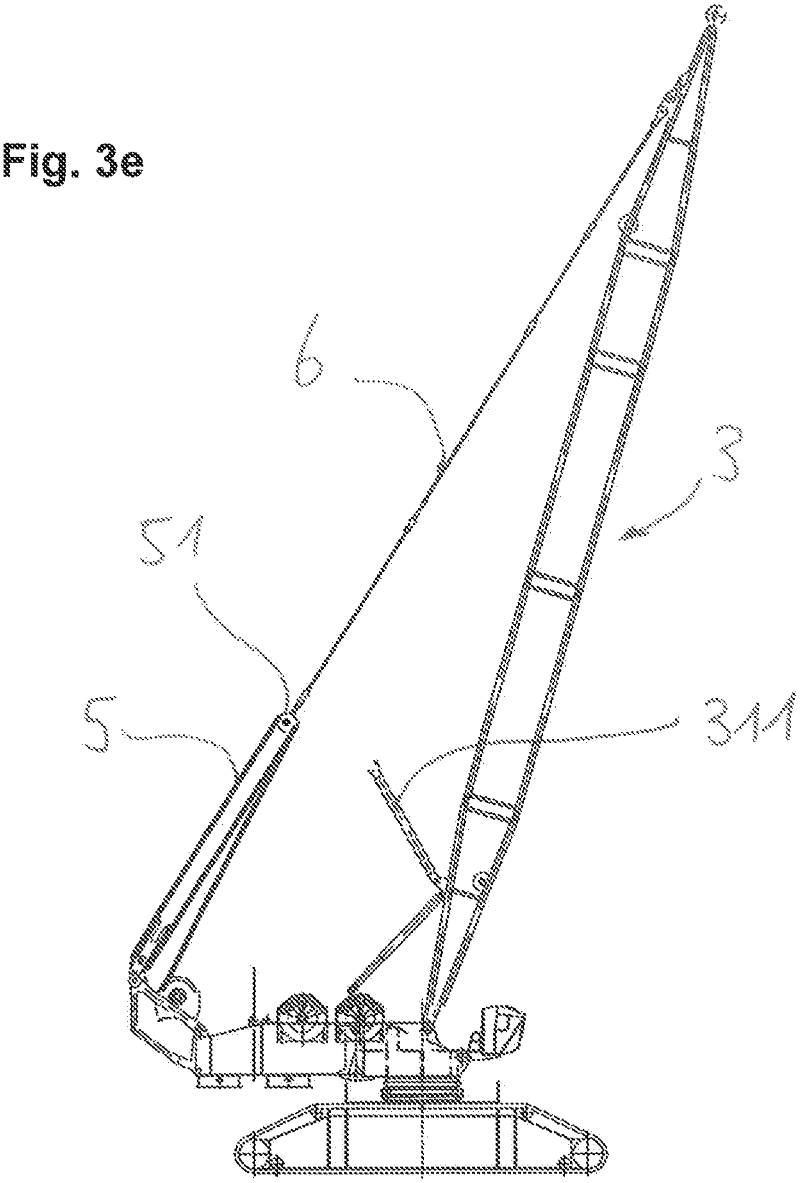
Figure 3F:
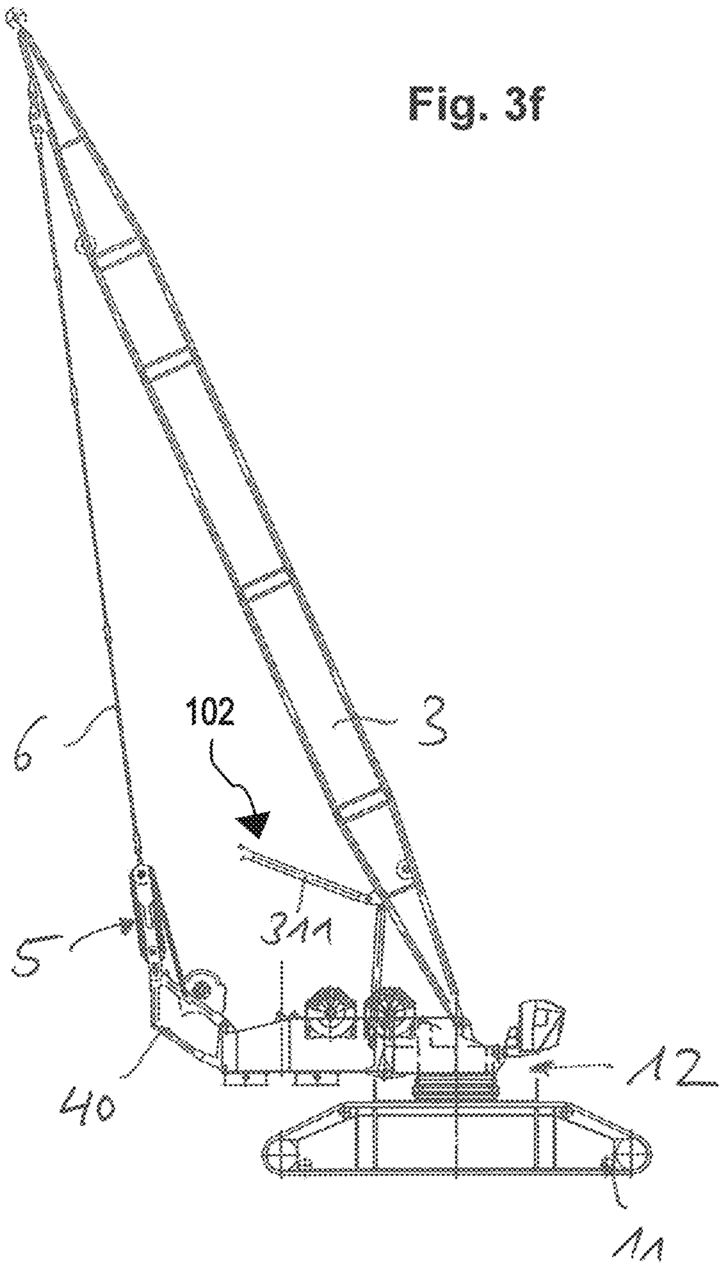
Figure 4:
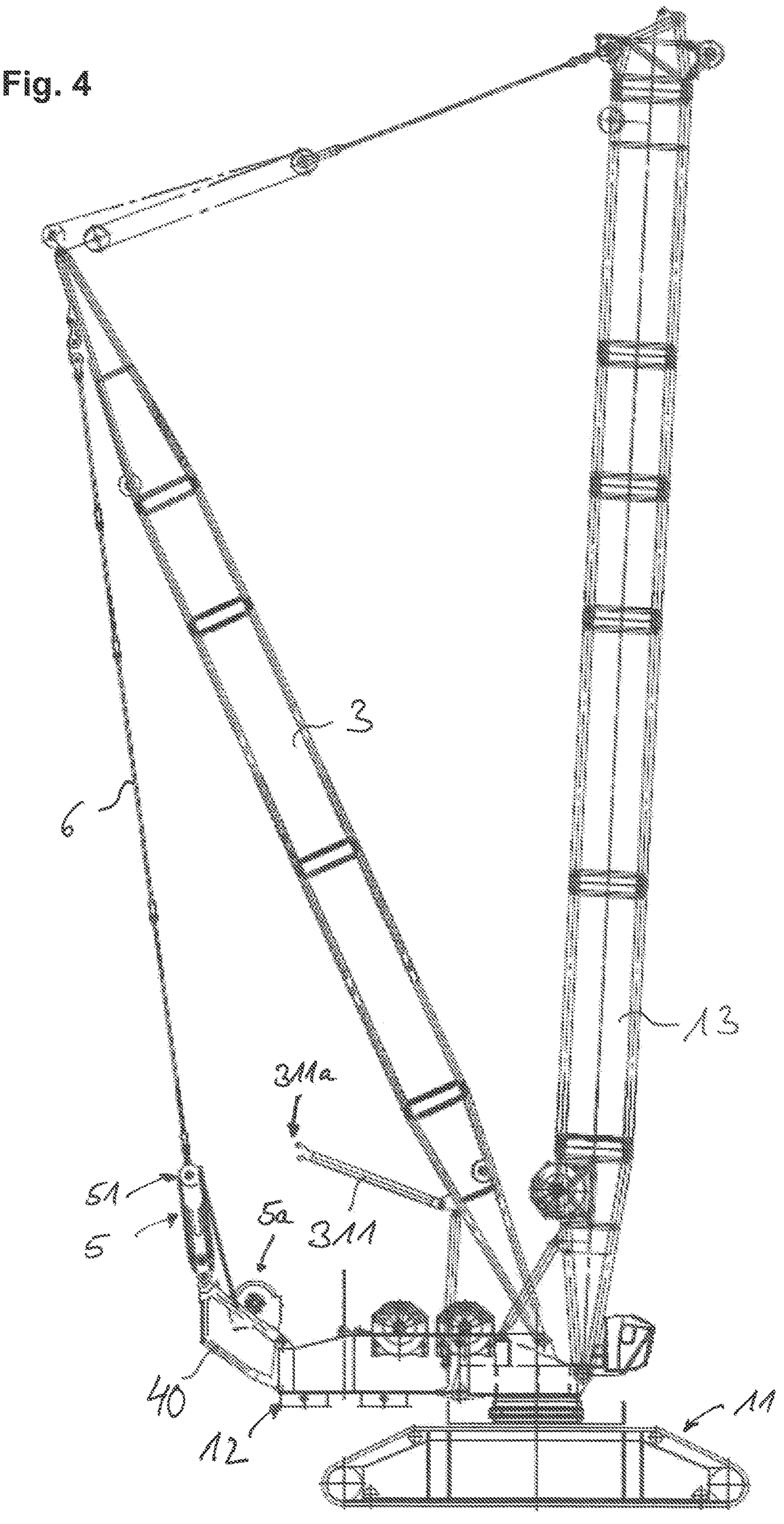
FIG. 4: shows a side view of the crane according to the invention with erected derrick boom and mounted main boom.

The assembly and deposition process of the derrick boom 6 can be illustrated with reference to the crane states of FIGS. 3*a*-3*f* shown in chronological order. In the first step as shown in FIG. 3*a*, the counter-boom articulation piece 31 of the derrick boom 3 is mounted on the turntable 12. The pressure prop 311 is premounted already on the counter-boom articulation piece 31. The disassembly and deposition process takes place in the reverse order (FIGS. 3*f* to 3*a*).

In the succeeding method step as shown in FIG. 3*b*, the pressure prop 311 is folded forwards in the direction of the derrick boom tip. At the same time, the cable adjuster 5 is extended by unwinding the retracting mechanism 5 and the top block 51 likewise is pulled forwards in the direction of the derrick boom tip so that its roller axis can be received by the bearing point 311*a* of the pressure prop. The top block 51 of the cable adjuster 5 can temporarily be fixed to the pressure prop 311 by means of a locking mechanism 101. At the same time, the top block 51 is bolted to the guying 6 of the derrick boom 3.

In the next method step as shown in FIG. 3c, the pressure prop 311 is erected by actuating the retracting mechanism of the cable adjuster 5, in particular pivoted rearwards in the direction of the erecting trestle 40. As a result, the guying 6 of the derrick boom 3 is tensioned at the same time.

By further retraction of the stranding of the cable adjuster 5 by means of the retracting mechanism 5a, the counter-boom 3 can be erected, which is shown in FIG. 3d. FIG. 3a also approximately illustrates the erecting angle of the derrick boom 3, at which the top block 51 of the cable adjuster 5 just is located at the bearing point 311a on the pressure prop 311, but already starts to lift off from the same. By further erection of the derrick boom 3 into the position shown in FIG. 3a, the cable adjuster 5 completely lifts off from the pressure prop 311. The pressure prop 311 is functionless from this state and remains in position by means of an arresting device 102. For the sake of completeness, FIG. 3f also shows the desired end position of the derrick boom 3. This representation in principle is identical to the representation of FIG. 4, with the exception that the latter already shows the mounted main boom 13. A known fallback press 312 for the counter-boom 3 is still necessary and is shown in FIGS. 3a to 3f and 4.

Accordingly, neither the cable adjuster 5 nor the guying 6 contacts the pressure prop 311 during the regular crane operation. The pressure prop hence remains functionless during the entire crane operation and is only required for erecting the derrick boom 3.

Figure 5A:
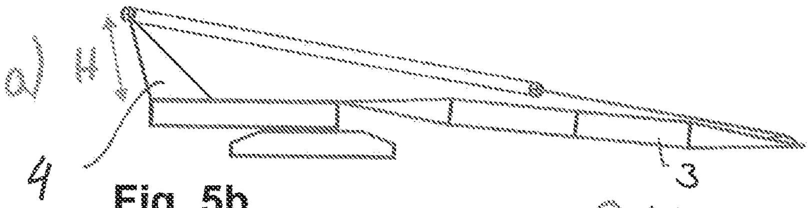
FIGS. 5*a*-5*h*: various comparisons of a known crane with the crane according to the invention in order to illustrate the advantages of the invention.
Figure 5B:
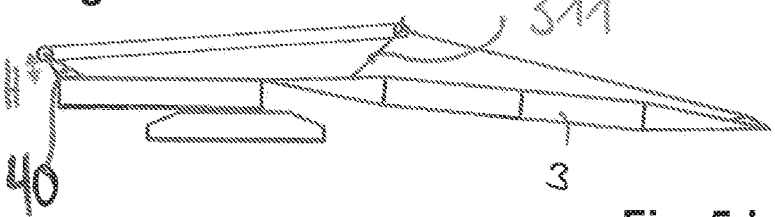
Figure 5C:
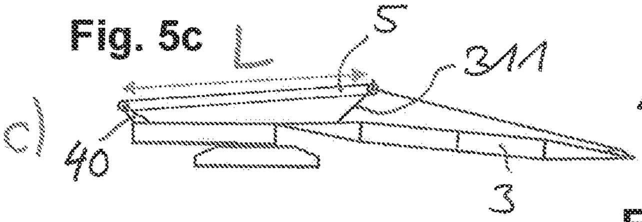
Figure 5D:
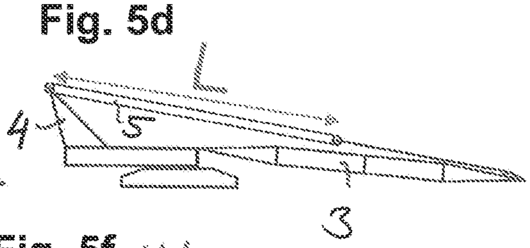

In FIGS. 5a to 5h, schematic representations of the crane according to the invention are compared with crane constructions of the prior art in order to visualize the advantages of the invention. The comparison of FIGS. 5a, 5b serves to illustrate the proportions of an erecting trestle 4 according to the prior art (FIG. 5a) and of the erecting trestle 40 according to the present invention (FIG. 5b). What is clearly visible is the distinct difference in height of both erecting trestles 4, 40. The erecting trestle 40 is a simpler and smaller stationary erecting trestle 40. This results in distinct weight and cost savings during manufacture. To obtain a sufficient lever arm H during the erection of the counter-boom 3, it is necessary in the prior art (FIG. 5a) to design the erecting trestle 40 relatively large and high. By using the pressure prop 311 described here (FIG. 5b), the erecting trestle 40 at the rear of the turntable can be designed distinctly smaller.

In the crane according to the invention, a distinctly smaller length L at the same time is necessary for the cable length in the retracting mechanism of the cable adjuster 5. A direct comparison of a stationary erecting trestle 4 of conventional construction (FIG. 5d) and the inventive crane body (according to FIG. 5c) described here shows that the cable length L, which is necessary for erection by means of the retracting mechanism 5a, is shorter than in FIG. 5d. The shorter length L is multiplied by the reeving of the cable for the cable adjuster 5. The shorter length L is due to the smaller erecting trestle 40 in the solution described here (FIG. 5c), which leads to a more favorable erecting geometry.

Figure 5E:
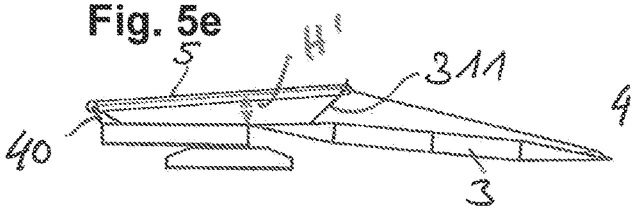
Figure 5F:
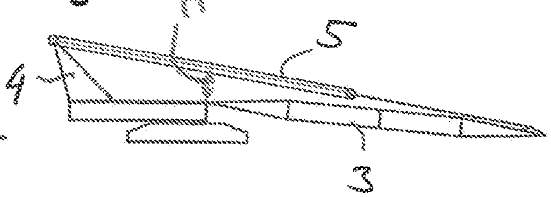

Furthermore, the solution according to the invention also provides a better lever arm H' for the cable adjuster 5 (see FIG. 5e) when the counter-boom 3 is erected (a change in angle of the counter-boom 3 leads to a smaller change in lever arm). When the counter-boom 3 according to the conventional crane of FIG. 5f is lowered down further, a change in angle of for example one degree leads to a greater reduction of the lever arm than is the case with the crane according to the invention as shown in FIG. 5e. The lever arm H' relevant here is the perpendicular distance between the center line of the cable adjuster 5 and the counter-boom articulation point.

Figure 5G:
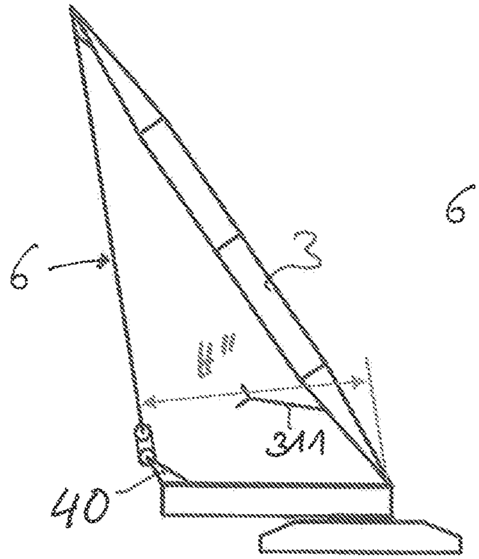
Figure 5H:
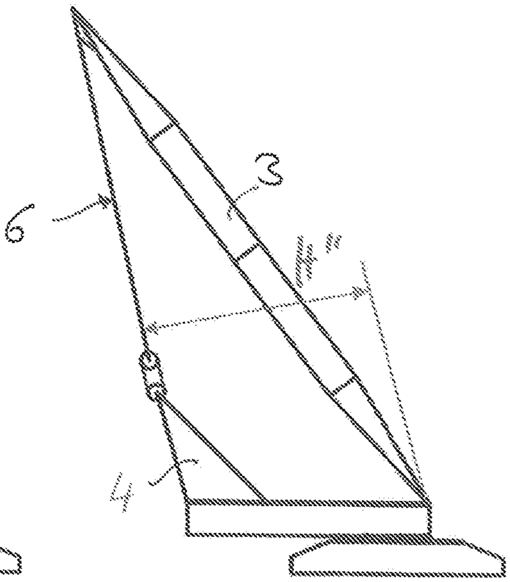

In addition, a slightly better geometry can be obtained in the crane according to the invention (FIG. 5g) as compared to a conventional crane (FIG. 5h). Due to the shorter stationary erecting trestle 40, a better lever arm H" is obtained in some counter-boom positions, as this is shown in FIG. 5g compared with FIG. 5h. In the representation of FIG. 5g, the lever arm H" is slightly longer than the lever arm H" of FIG. 5h with the same boom length and uppercarriage length, i.e. a greater moment can be generated with the same force in the guying strand 6. The lever arm H" relevant here is the perpendicular distance between the boom guy 6 and the counter-boom articulation point.

The invention claimed is:

1. A crane comprising a main boom and a counter-boom as well as an erecting trestle arranged on the uppercarriage of the crane, which is connected to a guying of the counter-boom via a cable adjuster,
   - wherein at least one pressure prop articulated to the counter-boom or on the pivot axis of the counter-boom is provided in order to temporarily receive the cable adjuster and/or the guying, and wherein the cable adjuster or guying is configured to lift off from the receiving point of the pressure prop automatically at a particular erecting angle of the counter-boom, wherein the particular erecting angle of the counter-boom occurs after the counter-boom is at least partially erected.

2. The crane according to claim 1, wherein the pressure prop is pivotally attached to the back of the counter-boom in the vicinity of a boom foot of the counter-boom or a pivot axis of the counter-boom.

3. The crane according to claim 2, wherein a bearing point of the pressure prop for receiving the cable adjuster includes an arresting device or a stop for the cable adjuster/guying received in order to be able to apply a tensile force causing a pivotal movement of the pressure prop onto the pressure prop by means of the cable adjuster.

4. The crane according to claim 3, wherein by means of the bearing point of the pressure prop a roller axis of a top block of the cable adjuster can be received, and wherein a locking mechanism is provided for the temporary fixation of the roller axis at the bearing point.

5. A method for erecting the counter-boom of a crane according to claim 3, the method comprising:
   - receiving, at the beginning of the erecting process, the cable adjuster or guying by the bearing point of the pressure prop of the counter-boom at a small erecting angle of the counter-boom;
   - urging away, by means of the pressure prop, the cable adjuster from the back of the counter-boom; and
   - automatically lifting the cable adjuster or guying from the pressure prop at a defined erecting angle of the counter-boom, the defined erecting angle occurring after the counter-boom is at least partially erected.

6. The method according to claim 5, wherein in a first step the counter-boom is mounted on the uppercarriage together with the pressure prop.

7. The method according to claim 6, wherein after the assembly of the counter-boom, the pressure prop is folded forwards in the direction of the counter-boom tip, the cable adjuster is connected to the guying, and the pressure prop is deposited on the bearing point.

8. The method according to claim 7, wherein by retracting a retracting mechanism of the cable adjuster, the pressure prop is erected and the guying is tensioned.

9. The method according to claim 8, wherein the counter-boom is erected by retracting the retracting mechanism of the cable adjuster.

10. The method according to claim 5, wherein the pressure prop is connected to the cable adjuster or the guying only for erecting the counter-boom.

11. The crane according to claim 2, wherein the pressure prop is pivotable about a horizontal axis.

12. The crane according to claim 2, wherein the pressure prop is pivotally attached to the boom foot of the counter-boom.

13. The crane according to claim 1, wherein the erecting trestle is stationarily mounted on the uppercarriage.

14. The crane according to claim 13, wherein the erecting trestle is designed on the uppercarriage as a stationary and is mounted at the rear end of the uppercarriage, and wherein the erecting trestle receives a retracting mechanism of the cable adjuster.

15. The crane according to claim 1, wherein the counter-boom is a lattice boom.

16. The crane according to claim 1, wherein the pressure prop is configured to fixedly support the cable adjuster in a position away from the counter-boom when the counter-boom is being erected.

17. The crane according to claim 1, wherein the pressure prop comprises a first arm and a second arm, wherein a fixed angle is formed between the first arm and the second arm, and wherein the first arm is connected to the second arm at a vertex located on the counter-boom.

* * * * *